United States Patent Office 2,885,296
Patented May 5, 1959

2,885,296

CRACK SEALING COMPOUND

Artie L. Welden, Canby, Oreg., assignor of twenty-five percent to Claude A. Taylor, twenty-five percent to Ivor C. Neiland, and twenty-five percent to Ben Cropper, all of Canby, Oreg.

No Drawing. Application August 23, 1955
Serial No. 530,201

3 Claims. (Cl. 106—33)

This invention relates to a composition for stopping leaks in conduits, radiators, engine blocks, and the like and, more particularly, to a composition of this type which is effective to seal small, medium or large cracks and at elevated temperatures.

One object of my invention is to provide a crack sealing compound which is water miscible and which will both adhere to the inner peripheral surface of a conduit and will lodge in a crack or leak so as to seal the same even though the temperature of the fluid carried by the conduit may be elevated substantially above normal atmospheric temperatures.

There are today upon the market a great variety of sealing compounds and compositions for use in stopping leaks in liquid circulating systems. Most of these include as an essential ingredient either a powdered or a fibrous material suitable as a binder or a gluelike substance capable of hardening. In testing many of these present compositions and in utilizing the same in automobile radiators and engine blocks, I have found that they possess certain inherent disadvantages traceable to the choice of the binder material or the glue. It is one object of the instant invention to provide an improved composition and one which overcomes these disadvantages as now will be set forth.

Broadly, I have found that previous compositions and compounds fall into two classifications. The first of these provide a gluelike substance often consisting of synthetic resin soaps, rosin, paste, gum arabic, or the like. In theory, these flow with the fluid in the conduit until they encounter a leak or a crack, at which time exposure to the air forms a solid mass sealing the crack or leak. One disadvantage of this first type of composition is that the efficiency thereof is limited to small cracks or points of leakage. That is to say, the solidified mass formed by the binder is either too soft, too brittle or too weak structurally and thus will not resist dislodgement due to subsequent vibration or shock in a crack or leak of any substantial size. It is one object of the instant invention to provide a composition for stopping leaks which is effective to seal both small and large cracks and which is of superior structural strength when hardened in order to resist vibration, inadvertent dislodgment, and shock. In this manner, leakage through a crack sealed by my composition is prevented for a longer period of time after the seal is effected.

The second basic type of composition for stopping leaks contains what might be termed a filler substance such as comminuted or powdered asbestos, finely ground paper, wood pulp, or the like. This second classification provides a better seal in larger openings because the filler material forms a mat or a plug which is capable of covering a relatively large area. This mat, of course, must be supplemented with other substances which cause the mat to harden or solidify thereby lending structural strength to the seal. One disadvantage inherent in previous compositions of this type, however, is that the filler material often tends to block circulation in the conduit or radiator. For example, the conduits in the radiator of a vehicle often carry rust, projections, scale, and the like upon which the filler material catches thereby obstructing the flow through the conduit. To the extent that the filler thus is removed from the solution, the sealing effectiveness of the remaining composition also is reduced. It thus is a further object of the instant invention to provide a composition in which the above disadvantage is overcome.

To the above ends, my composition includes several ingredients. The first of these and the largest in terms of volume is waterglass. Waterglass is sodium silicate, potassium silicate, or both of these silicates, in the latter case of which it is termed "double" waterglass. In appearance, it is a viscous syrupy liquid which hardens or cements over at a rapid rate when exposed to the atmosphere at elevated temperatures. A second ingredient of my composition is a powder which includes mixed quantities of asbestos powder and finely ground charred bonemeal. In one species of the invention, the proportions of these two powders are one to one, and, in the second species, I utilize twice as much powdered asbestos as charred bonemeal.

As a further ingredient of my composition, sal ammoniac in a saturated solution is utilized. Sal ammoniac is ammonium chloride and I utilize a small amount only for a purpose hereinafter to be described with relationship to a typical use of the composition.

The following exemplary proportions will illustrate more clearly the nature of my crack sealing compound. A first species, to be utilized in radiators, comprises approximately one liquid pint of waterglass, one ounce by weight of powdered asbestos, one ounce by weight of finely ground charred bonemeal, and ten drops of liquid sal ammoniac. The second species of my invention, for use in stopping leaks in engine blocks, includes approximately one liquid pint of waterglass, one and one-third ounces by weight of powdered asbestos, two-thirds of an ounce by weight of finely ground charred bonemeal, and ten drops of liquid sal ammoniac. To obtain commercial quantities, of course, each of the above amounts is multiplied by a common factor. For example, I mix approximately five gallons of the composition by adding to five liquid gallons of the waterglass approximately five pounds of the powder consisting of the asbestos and charred bonemeal. To this mixture I add approximately one fluid ounce of the sal ammoniac after which the composition is mixed and bottled or otherwise sealed and packaged for ultimate use.

Utilizing the above described composition as a sealing compound, it is noted that the composition is water miscible and may be poured into the water jacket of an engine where it mixes with the water. For example, when the second species is to be utilized in an engine block, approximately one pint is added to the water jacket. Any opening in the engine block leading to the water chamber may be utilized. The tapped hole for the thermostat in the engine block is a convenient point of access. First of all, the engine and the water coolant are brought up to a normal operating temperature of an exemplary 180° F. The composition then is added, it being noted that the engine block itself is cut off from circulation with the radiator and pump in order to provide a greater concentration. The composition then is distributed throughout the block, a certain amount adhering to the inner surfaces of the water jacket and sealing any existing cracks or other leaks.

In analyzing the function of the composition, I have come to believe that the dry mixture of asbestos powder and charred bonemeal are carried suspended in the waterglass and the water until a crack or leak is encountered. This filler material then passes through and fills the crack forming a resilient plug. The waterglass bonds this plug together and adhesively secures the same to the walls of the crack. Upon encountering the atmosphere and because of the elevated temperature, the waterglass hardens and cements over to form a protective coating. At the same time, the sal ammoniac forms a scale over the hardened plug and the surface thereof so as to give a protective layer. Leaks are stopped during the first ten seconds of use and the material sets up to a final hardness in about ten minutes. It is to be noted that the sealing material actually coacts the entire water jacket and not merely the cracked area. Further, after the material has set up, the engine should be operated in the usual manner or the temperature otherwise maintained until the final set has been effected. Experience has shown that many engine blocks have minute cracks and small areas of leakage which are a common problem of particular acuteness in used car lots. The engine blocks often are structurally sound and the problem is merely one of sealing against leakage rather than welding or bonding the cracked area at a high cost. In these instances, the composition of the instant invention is of particular utility.

In a radiator, less of the powdered asbestos is utilized since this material is one which tends to obstruct the flow should it catch upon rust, flakes, or projections within the radiator. Thus, supplemented by a greater proportion of the finely ground charred bonemeal, the function is similar to that of the composition utilized in an engine block but the proportions are varied. It has been my experience that powdered asbestos swells and lodges in larger quantities than does the finer filler material of powdered charred bonemeal. In any event, one or two pints of the composition are added to the radiator after the coolant has been brought up to an operating temperature. This seals the cracks or other leaks in the radiator. It further should be noted that while my composition is of increased utility at the elevated temperatures encountered with internal combustion engines, it also will function at atmospheric temperature. In the latter instance, however, the rate of solidification is slower and thus I prefer to operate the engine and to bring the water up to operating temperature before employing the composition to stop a leak in either an engine block or a radiator.

In summary, it will be seen that I have provided a composition for stopping leaks in radiators, engine blocks, conduits, and the like. This composition forms a water insoluble plug in a crack or leak, which plug is of superior structural strength and thus will resist vibration and shock. Further, it is effective to seal leaks and cracks of varying physical dimensions in direct contrast with previous sealers which have been effective with either small cracks or with large cracks but not with both. Still further, my composition is inexpensive, utilizes a minimum number of ingredients each of which is active. It is exceptionally fast in action, most leaks being stopped in less than ten seconds and the plug which thus is formed being hardened to a final set in about ten minutes. In combination, the powdered ingredients of my composition fill a crack with a resilient plug, the waterglass hardens in order adhesively to bond the plug together and to secure the plug to the walls of the crack, and the sal ammoniac forms a scale over the hardened plug and the surface to serve as a protective shield or layer over the cemented plug.

I claim:

1. A composition for stopping leaks in radiators which in passing from a water chamber through a crack in the wall of said chamber forms a resilient plug within said crack, said plug defining interlaced fibers and embedded powder, which plug is adhesively bonded to the sides of said crack and is shielded by a scale bridging the entrance thereto, said composition, consisting essentially of approximately one liquid pint of waterglass, one ounce by weight of powdered asbestos, one ounce by weight of finely ground charred bonemeal, and then drops of liquid sal ammoniac.

2. A composition for stopping leaks in engine blocks which in passing from a water chamber through a crack in the wall of said chamber forms a resilient plug within said crack, said plug defining interlaced fibers and embedded powder, which plug is adhesively bonded to the sides of said crack and is shielded by a scale bridging the entrance thereto, said composition, consisting essentially of approximately one liquid pint of waterglass, one and one-third ounces by weight of powdered asbestos, two-thirds of an ounce by weight of finely ground charred bonemeal, and ten drops of liquid sal ammoniac.

3. A composition for stopping leaks in radiators and engine blocks which in passing from a water chamber through a crack in the wall of said chamber forms a resilient plug within said crack, said plug defining interlaced fibers and embedded powder, which plug is adhesively bonded to the sides of said crack and is shielded by a scale bridging the entrance thereto, said composition consisting essentially of approximately one liquid pint of waterglass, two ounces by weight of a finely ground powder including a mixture of charred bonemeal and asbestos, said charred bonemeal and asbestos each being present in substantial amounts related one with the other, and a substantial and effective amount but less than one dram liquid measure of sal ammoniac.

References Cited in the file of this patent

UNITED STATES PATENTS

| 1,351,149 | Ashenhurst | Aug. 31, 1920 |
| 1,868,195 | Cumming et al. | July 19, 1932 |
| 1,896,611 | Cross | Feb. 7, 1933 |
| 2,188,311 | Reimers | Jan. 30, 1940 |
| 2,315,321 | Evans | Mar. 30, 1943 |

FOREIGN PATENTS

| 22,308 | Great Britain | of 1897 |
| 292,388 | Great Britain | June 21, 1928 |

OTHER REFERENCES

Bennett-Chemical Formulary Vol. VIII, Chemical Pub. Co., 1948, page 23.